United States Patent
Agback et al.

[11] 3,915,951
[45] Oct. 28, 1975

[54] 4(3-CARBOXY-4-HYDROXYPHENYLAZO)-BENZENLSULPHONAMIDE PYRIDINE COMPOUNDS HAVING IMMUNOSUPPRESSIVE EFFECTS

[75] Inventors: Karl Hubert Agback, Uppsala; Ragnvald Erik Lindblom, Almunge, both of Sweden

[73] Assignee: Pharmacia Aktiebolag, Uppsala, Sweden

[22] Filed: Nov. 20, 1972

[21] Appl. No.: 307,903

[30] Foreign Application Priority Data
Nov. 26, 1971 Sweden.............................. 15218/71

[52] U.S. Cl. ................. 260/156; 260/207; 424/226
[51] Int. Cl.[2] ............... H61K 31/655; C07C 107/00
[58] Field of Search...................... 260/156; 424/226

[56] References Cited
UNITED STATES PATENTS
2,396,145  3/1946  Anders et al. ...................... 260/156
3,681,319  8/1972  Lindberg............................. 260/156

*Primary Examiner*—Floyd D. Higel
*Attorney, Agent, or Firm*—Fred Philpitt

[57] ABSTRACT

The compound:

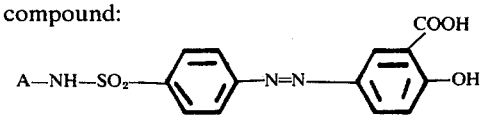

where A is either (1)

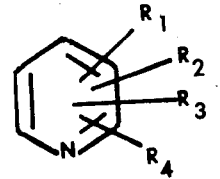

where $R_1$; $R_2$ and $R_3$ are either hydrogen, lower alkyl, halogen, lower alkoxy, cyano, nitro or carboxamide and $R_4$ is either lower alkyl, halogen, lower alkoxy, cyano, nitro or carboxamide, or (2)

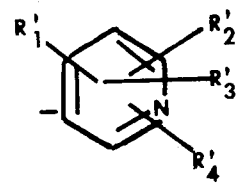

where $R_1'$; $R_2'$; $R_3'$ and $R_4'$ are either hydrogen, lower alkyl, halogen, lower alkoxy, cyano, nitro or carboxamido.

These compounds are useful in immunosuppressives especially in skin transplants.

16 Claims, No Drawings

4(3-CARBOXY-4-HYDROXYPHENYLAZO)-BENZENLSULPHONAMIDE PYRIDINE COMPOUNDS HAVING IMMUNOSUPPRESSIVE EFFECTS

These compounds are useful as immunosuppressives especially in skin transplants

The novel pyridine derivatives are compounds of the general formula I

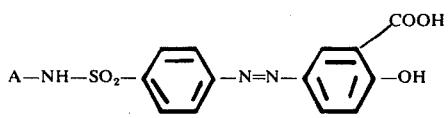

where A is a group having the formula II

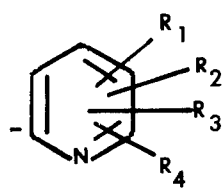

in which $R_1$; $R_2$ and $R_3$ are each hydrogen or lower alkyl, halogen, lower alkoxy, cyano, nitro or carboxamido and $R_4$ is lower alkyl, halogen, lower alkoxy, cyano, nitro or carboxamido, or A is a group having the formula III

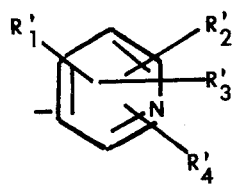

in which $R_1'$; $R_2'$; $R_3'$ and $R_4'$ are each hydrogen, lower alkyl, halogen, lower alkoxy, cyano, nitro or carboxamido. The novel compounds may optionally exist in the form of pharmaceutically acceptable salts thereof.

The invention also relates to the preparation of the novel pyridine derivatives by means of a method characterized (a) in that a compound of the formula IV

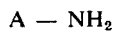

$$A - NH_2 \quad (IV)$$

where A has the aforementioned significance, is reacted with a compound of the formula V

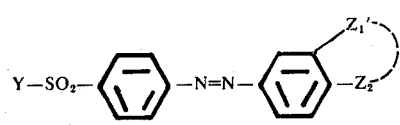

where $Z_1'$ is a group capable of being converted to a carboxy group and $Z_2$ is a hydroxy group or a group capable of being converted to a hydroxy group, $Z_1'$ and $Z_2$ optionally being linked together, and Y is halogen, preferably chloro, whereupon the obtained compound of the formula VI

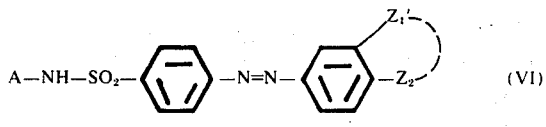

where A; $Z_1'$ and $Z_2$ have the aforementioned significance, is treated to convert the group $Z_1'$ to a carboxy group and $Z_2$ to a hydroxy group when $Z_2$ is a group capable of being converted to a hydroxy group.

In the majority of cases, the reaction of the compound of the formula IV with the compound of the formula V can be effected in the presence of an acid binding agent, preferably an organic tertiary amine or a basic heterocyclic compound, such as pyridine, for example. The reaction process can also be effected in the presence of an excess of the compound IV, which then functions as the acid binding agent. The reaction is preferably effected in the presence of an organic solvent, e.g., pyridine. The obtained compound of the formula VI can be subjected to oxidation or hydrolysis for the purpose of converting the group $Z_1'$ to a carboxy group, and optionally to a hydrolysis for converting the group $Z_2$ to a hydroxy group, $Z_1'$ is preferably a group which is inert under the reaction conditions used during the reaction process, but which later can be converted to a carboxy group. As an example of such groups can be mentioned the group

—COOR, where R is alkyl,

where $R_a$ and $R_b$ are hydrogen or alkyl or together alkylene,

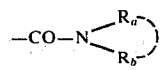

where $R_a$, $R_b$ and $R_c$ are alkyl, aryl, or —CN, all of which can be converted to —COOH by alkaline or acid hydrolysis.

Other examples of groups which can be converted to carboxy groups are —CHO, —CH$_2$OH, —CH$_2$OR, where R is alkyl or aryl,

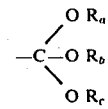

where $R_a$ and $R_b$ are alkyl or aryl, capable of being converted to carboxy groups by oxidation processes.

The following are examples of groups $Z_2$ capable of being converted to OH:

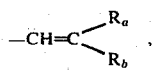

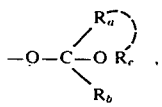

where $R_a$ and $R_b$ are hydrogen, alkyl or aryl and $R_c$ are alkyl or aryl, $R_a$ and $R_c$ being optionally linked together,

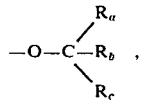

where $R_a$ is hydrogen, alkyl or aryl and $R_b$ and $R_c$ are alkyl or aryl, $R_b$ and $R_c$ being both aryl when $R_a$ is hydrogen, which groups are capable of being converted into a hydroxy group by means of acid hydrolysis. $Z_2$ is preferably the groups —O—COR or —O SO$_2$R, where R is alkyl or aryl, said groups being capable of being converted to a hydroxy group by means of alkaline hydrolysis.

$Z_1'$ and $Z_2$ may optionally be linked together. As an example of the residue

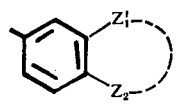

where $Z_1'$ and $Z_2$ are linked together, can be mentioned:

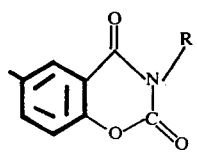

where R is hydrogen, alkyl or aryl,

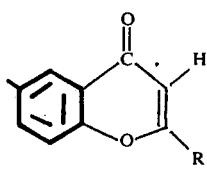

where R is hydrogen, alkyl or aryl, and

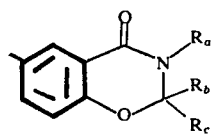

where $R_a$, $R_b$ and $R_c$ are hydrogen, alkyl or aryl. These groups can be converted to salicyclic acid residues by hydrolysis, preferably alkaline hydrolysis.

In accordance with an alternate method, the novel compound I can be prepared by a method which is characterized in that a compound of the formula VII

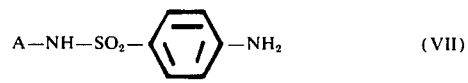

(VII)

where A has the aforementioned significance, is diazotized, preferably by treatment with nitrous acid, in an aqueous environment, whereafter the obtained diazonium salt is reacted with a compound of the formula VIII

(VIII)

where $Z_1$ is carboxy or a group capable of being converted to a carboxy group, preferably carboxy, and in an alkaline aqueous environment, whereafter the compound of the formula IX

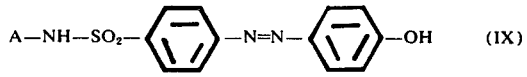

(IX)

where A and $Z_1$ have the aforementioned significance, is treated to convert the group to the carboxy group when $Z_1$ is a group capable of being converted to a carboxy group. The conversion is normally effected with an oxidizing or hydrolysing agent.

The invention also embraces those cases in the aforementioned different embodiments of the general method in which the groups $Z_1$ and $Z_2$ are converted, preferably converted to the carboxy and/or hydroxy group under the differing reaction conditions.

The novel compounds of the present invention have valuable biological properties and good physiological acceptability.

The novel compounds present significant immunosuppressive effects as opposed to the known compound 2-[4-(4-hydroxy-3-carboxy-phenylazo)-benzene sulphonamido]-pyridine.

It is known that test animals subjected to skin transplantations, where the transplants originate from another strain within the same species, reject these transplants after a certain period of time. This rejection of the transplanted skin can be delayed for a certain length of time by treating the animals with an active immunosuppressive substance. The following table illustrates the increased survival time for the transplant on mice treated with different substances in comparison with untreated mice. Each result is the mean value obtained from 10 treated and 10 untreated animals. The letter A in the table signifies the aforementioned drug substance 2-[4-(4-hydroxy-3-carboxy-phenylazo)-benzene sulphonamido]-pyridine.

TABLE

| Designation | Formula or name | Increased survival time in calendar days | Statistical significance |
|---|---|---|---|
| A | Salicylazosulpha-pyridine | 1.3 | no |
| B | 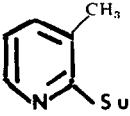 | 6.2 | yes |
| C | 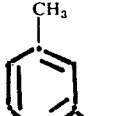 | 4.0 | yes |
| D | 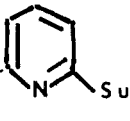 | 5.1 | yes |
| E | 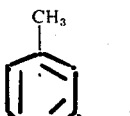 | 2.3 | yes |
| F | 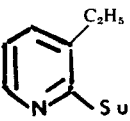 | 5.9 | yes |
| G | 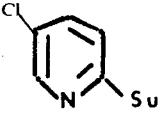 | 2.9 | yes |
| H | 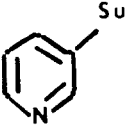 | 2.4 | yes |

Su is —NH—SO$_2$—⟨◯⟩—N=N—⟨◯⟩—COOH / —OH

The effects are judged to be statistically significant if the confidence coefficient is greater than 0.95. The dosages administered comprise 500 mg per kg body weight and were given daily during the test period.

It is reported in Swedish patent 130 524 that the compound 2-[4-(4-hydroxy-3-carboxy-phenylazo)-benzene sulphonamido]-pyridine has an antibacterial effect. None of the novel compounds of the invention showed antibacterial activity during any of the tests carried out.

The novel compounds are thus potential therapeutical agents for use in organ transplants and for treating autoimmuno diseases.

EXAMPLE 1

2-[4-(3-carboxy-4-hydroxy-phenylazo)-benzene-sulphonamido]3-methyl pyridine a. 36.4 grams of 4-(4-acetoxy-3-carbomethoxy-phenylazo)-benzene sulphonylchloride, 10 grams of 2-amino-3-methyl pyridine and 90 ml of pyridine were mixed and stirred for 3.5 hours. The solution was emptied onto ice and hydrochloric acid. The crystalline product was filtered off and washed with water. The product was then hydrolysed with diluted sodium hydroxide and acidified, whereafter the product was filtered off and dried.

Melting point 253°C with decomposition.

b. 20 g of 4-(4-acetoxy-3-carbomethoxy-phenylazo)-benzene sulphonylchloride, 11 g of 2-amino-3-methyl pyridine and 100 ml of toluene were mixed and stirred for 2.5 days. The toluene solution was admixed with diluted sodium hydroxide and the mixture heated to azeotropically distill the toluene. The residual aqueous solution was then acidified. The product was filtered off and dried.

Melting point 252°C with decomposition.

c. 5.25 g of 2-(4-amino benzene-sulphonamido)-3-methyl-pyridine were dissolved in a mixture of 16.5 ml of water and 5 ml of concentrated hydrochloric acid. The solution was cooled to 0°C, whereafter a solution of 1.45 g of sodium nitrite in 10 ml of cold water was added while stirring and cooling. After 10 minutes, the reaction mixture was transferred to a vessel containing a cold solution of 3.0 g of salicyclic acid, 4.1 g of sodium hydroxide in 20 ml of water. The obtained mixture was filtered off and the filtrate acidified in a cold environment with hydrochloric acid. The obtained product was recrystallized from dilute alcohol, the title substance being obtained thereby.

EXAMPLE 2

2-[4-(3-carboxy-4-hydroxy-phenylazo)-benzene-sulphonamido]-4-methyl-pyridine 16 g of 4-(4-acetoxy-3-carbomethoxy-phenylazo)-benzene sulphonyl chloride, 4.6 g of 2-amino-4-methyl pyridine and 40 ml of pyridine were mixed and stirred for 2 hours. The process was then continued as described in Example 1 (a) above.

Melting point 270°C with decomposition.

EXAMPLE 3

2-[4-(3-carboxy-4-hydroxy-phenylazo)-benzene sulphonamido]-5-methyl-pyridine 16 g of 4-(4-acetoxy-3-carbomethoxy-phenylazo)-benzenesulphonyl chloride, 4.6 g of 2-amino-5-methyl pyridine and 35 ml of pyridine were mixed and stirred for 2 hours. The process was then continued in accordance with Example 1 (a) above.

Melting point 252°C with decomposition.

EXAMPLE 4

2-[4-(3-carboxy-4-hydroxy-phenylazo)-benzene-sulphonamido]-6-methyl-pyridine 16 g of 4-(4-acetoxy-3-carbomethoxy-phenylazo)- benzenesulphonylchloride, 4.6 g of 2-amino-6-methyl pyridine and 35 ml of pyridine were mixed and stirred for 2 hours. The process was then continued according to Example 1 a) above.

Melting point 252°C with decomposition.

EXAMPLE 5

2-[4-(3-carboxy-4-hydroxy-phenylazo)-benzene-sulphonamido]-4,6-dimethyl-pyridine 4 g 4-(4-acetoxy-3-carbomethoxy-phenylazo)-benzene-sulphonyl chloride, 1.3 g of 2-amino-4,6-dimethyl pyridine and 20 ml pyridine were mixed and stirred for 3 hours. The process was then continued in accordance with Example 1 a) above.

Melting point 257°C with decomposition.

EXAMPLE 6

2-[4-(3-carboxy-4-hydroxy-phenylazo)-benzene-sulphonamido]-5-chloro-pyridine.

16 g of 4-(4-acetoxy-3-carbomethoxy-phenylazo)-benzenesulphonyl chloride, 5.3 g of 2-amino-5-chloropyridine and 50 ml of pyridine were mixed and stirred. The process was then continued in accordance with Example 1 a) above.

Melting point 257° – 259°C with decomposition.

EXAMPLE 7

2-[4-(3-carboxy-4-hydroxy-phenylazo)-benzene-sulphonamido]-3-ethyl-pyridine 16 g of 4-(4-acetoxy-3-carbomethoxy-phenylazo)-benzenesulphonyl chloride, 5 g of 2-amino-3-ethyl pyridine and 50 ml of pyridine were mixed and stirred for 3 hours. The process was then continued in accordance with Example 1 a) above.

Melting point 233° – 235°C with decomposition.

EXAMPLE 8

2-[4-(3-carboxy-4-hydroxy-phenylazo)-benzene-sulphonamido]-3-ethoxypyridine 20 g of 4-(4-acetoxy-3-carbomethoxy-phenylazo)-benzenesulphonyl chloride, 8 g of 2-amino-3-ethoxy pyridine and 100 ml of pyridine were mixed and stirred for 3 hours. The process was then continued in accordance with Example 1 (a) above.

The melting point was 214° – 216°C with decomposition.

EXAMPLE 9

2-[4-(3-carboxy-4-hydroxy-phenylazo)-benzene-sulphonamido]-3-chloro pyridine 50 g of 4-(4-acetoxy-3-carbomethoxy-phenylazo)-benzenesulphonyl chloride, 17 g of 2-amino-3-chloropyridine and 150 ml of pyridine were mixed and stirred for 4 hours. The process was then continued in accordance with Example 1 a) above.

Melting point 240° – 242°C with decomposition.

EXAMPLE 10

3-[4-(3-carboxy-4-hydroxy-phenylazo)-benzene-sulphonamido]-2,6-dimethyl pyridine 16.8 g of 3-(4-amino-benzenesulphonamido)-2,6-dimethyl pyridine were dissolved in a mixture of 50 ml of water and 15 ml of concentrated hydrochloric acid and chilled to 0°C. A solution of 4.3 g of sodium nitrite in 25 ml water was added with cooling. After 15 minutes, the reaction mixture was transferred to a vessel containing 8.9 g of salicyclic acid and 12.2 g of sodium hydroxide in 60 ml of water. The obtained clear solution was acidified. After filtering the crystalline product and recrystallizing from the diluted alcohol, the title substance was obtained with a decomposition point of 270°C.

EXAMPLE 11

3-[4-(3-carboxy-4-hydroxy-phenylazo)-benzene-sulphonamido]-2chloro-pyridine 16 g of 4-(4-acetoxy-3-carbomethoxy-phenylazo)-benzenesulphonyl chloride, 5.3 g 3-amino-2-chloropyridine and 50 ml of pyridine were mixed and stirred for 3 hours. The process was then continued in accordance with Example 1 (a) above.

Melting point 237°C with decomposition.

EXAMPLE 12

5-bromo-2-[4-(4-hydroxy-3-carboxy-phenylazo)-benzene-sulphonamido]-6-methyl-pyridine 9.4 g of 2-amino-5-bromo-6-methyl pyridine, 19.9 g of 4-(4-acetoxy-3-carbomethoxy-phenylazo)-benzene-sulphonyl chloride and 50 ml of pyridine were mixed and stirred for 3 hours. The process was then continued in accordance with Example 1 a) above.

Melting point 253°C with decomposition after recrystallization from a mixture of dimethylformamide and ethanol.

EXAMPLE 13

3-[4-(3-carboxy-4-hydroxy-phenylazo)-benzene-sulphonamido]-pyridine 12 g of 4-(4-acetoxy-3-carbomethoxy-phenylazo)-benzenesulphonyl-chloride, 3 g of 3-aminopyridine and 60 ml of pyridine were mixed and stirred for 6 hours. The process was then continued in accordance with Example 1 (a) above.

Melting point 262°C with decomposition.

EXAMPLE 14

3-[4-(4-hydroxy-3-carboxy-phenylazo)-benzene-sulphonamido]-6-methoxy-pyridine 36.8 g of 4-(4-acetoxy-3-carbomethoxy-phenylazo)-benzenesulphonyl chloride, 11.5 g of 3-amino-6-methoxy-pyridine and 75 ml of pyridine were mixed while stirring for 2 hours. The process was then continued in accordance with Example 1 (a) above.

Melting point 228° – 230°C with decomposition.

EXAMPLE 15

2-[4-(4-hydroxy-3-carboxy-phenylazo)-benzene-sulphonamido]-5-methyl-pyridine 3.3 g of p-nitrobenzene-sulphonyl chloride, 3.3 g of 2-amino-5-methyl-pyridine and 25 ml of dry pyridine are mixed and agitated for 3 hours at room temperature. The solution is poured on ice and hydrochloric acid, filtered, washed with water, after which the product is dried.

The obtained product, 2.9 g, 69 ml of ethanol, 3.5 g of ammonium chloride and 17.5 ml of water are mixed and heated to 50°C. 2.8 g of zinc powder is added with strong agitation at this temperature. After the addition the mixture is agitated for 5 minutes at 50°C. The mixture is filtered and the zinc residues are washed with ethanol. The solution is cooled to 0°C and the solution of 8.3 g of FeCl₃ 6H₂O, 55 ml of water and 14 ml of ethanol is added, whereupon the mixture is stirred at 0°C for 90 minutes. The product is filtered off, washed with water and dried.

The obtained product, 2.6 g, 1.7 g of 5-aminosalicyclic acid methylester and 70 ml of acetic acid are mixed and heated at 80°C for 2 hours. Water is added and the mixture is cooled to 10°C. The crystallized product is filtered off and washed with water, whereupon it is dispersed in acetone. The substance is hydrolysed with 1 N NaOH for 30 minutes at 90°C. The solution is treated with charcoal, and then acidified. The mixture is cooled and the product filtered off and washed with water. The product is recrystallized from dimethylformamide and acetic acid. Melting point 252° – 254°C.

What we claim is:

1. A 4-(3-carboxy-4-hydroxy-phenylazo)-benzenesulphonamide pyridine of the formula

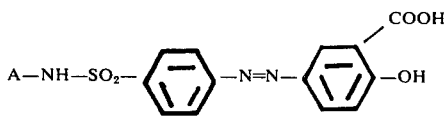

where A is a member selected from the group consisting of (A) a group of the formula

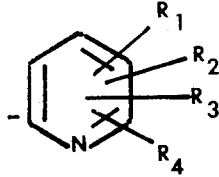

where $R_1$; $R_2$ and $R_3$ are each a member selected from the group consisting of hydrogen, lower alkyl, halogen, lower alkoxy, cyano, nitro and carboxamido and $R_4$ is a member selected from the group consisting of lower alkyl, halogen, lower alkoxy, cyano, nitro and carboxamido, and (B) a group of the formula

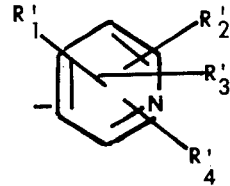

where $R_1'$; $R_2'$; $R_3'$ and $R_4'$ are each a member selected from the group consisting of hydrogen, lower alkyl, halogen, lower alkoxy, cyano, nitro and carboxamido.

2. A compound as claimed in claim 1 in the form of its pharmaceutically acceptable salt.

3. 2-[4-(3-carboxy-4-hydroxy-phenylazo)-benzene sulphonamido]-3-methyl-pyridine.

4. 2-[4-(3-carboxy-4-hydroxy-phenylazo)-benzene sulphonamido]-4-methyl-pyridine.

5. 2-[4-(3-carboxy-4-hydroxy-phenylazo)-benzene sulphonamido]-5-methyl-pyridine.

6. 2-[4-(3-carboxy-4-hydroxy-phenylazo)-benzene sulphonamido]-6-methyl-pyridine.

7. 2-[4-(3-carboxy-4-hydroxy-phenylazo)-benzene sulphonamido]-4,6-dimethyl-pyridine.

8. 2-[4-(3-carboxy-4-hydroxy-phenylazo)-benzene sulphonamido]-5-chloro-pyridine.

9. 2-[4-(3-carboxy-4-hydroxy-phenylazo)-benzene sulphonamido]-3-ethyl-pyridine.

10. 2-[4-(3-carboxy-4-hydroxy-phenylazo)-benzene sulphonamido]-3-ethoxy-pyridine.

11. 2-[4-(3-carboxy-4-hydroxy-phenylazo)-benzene sulphonamido]-3-chloro-pyridine.

12. 3-[4-(3-carboxy-4-hydroxy-phenylazo)-benzene sulphonamido]-2,6-dimethyl-pyridine.

13. 3-[4-(3-carboxy-4-hydroxy-phenylazo)-benzene sulphonamido]-2-chloro-pyridine.

14. 5-bromo-2-[4-(3-carboxy-4-hydroxy-phenylazo)-benzenesulphonamido]-6-methyl-pyridine.

15. 3-[4-(3-carboxy-4-hydroxy-phenylazo)-benzene sulphonamido]-pyridine.

16. 3-[4-(3-carboxy-4-hydroxy-phenylazo)-benzene sulphonamido]-6-methoxy-pyridine.

* * * * *